(12) United States Patent
Rana et al.

(10) Patent No.: US 10,680,702 B2
(45) Date of Patent: Jun. 9, 2020

(54) ARCHITECTURE FOR SINGLE RADIO FREQUENCY FEED FOR GNSS RECEIVER AND IRIDIUM MODEM

(71) Applicant: Honeywell International Inc., Morris Plains, NJ (US)

(72) Inventors: Narayan Singh Rana, Bangalore (IN); Ratnesh Kumar Gaur, Bangalore (IN); Kancharla HariNarayana, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 409 days.

(21) Appl. No.: 15/792,259

(22) Filed: Oct. 24, 2017

(65) Prior Publication Data

US 2019/0120972 A1 Apr. 25, 2019

(51) Int. Cl.
H04B 7/185 (2006.01)
G01S 19/33 (2010.01)
G01S 19/36 (2010.01)

(52) U.S. Cl.
CPC .......... *H04B 7/18517* (2013.01); *G01S 19/33* (2013.01); *G01S 19/36* (2013.01)

(58) Field of Classification Search
CPC ..... H04B 7/18517; G01S 19/21; G01S 19/33; G01S 19/36
See application file for complete search history.

(56) References Cited

U.S. PATENT DOCUMENTS

| 5,119,504 A * | 6/1992 | Durboraw, III ......... G01S 19/36 340/991 |
| 9,419,774 B2 | 8/2016 | Rana et al. |
| 2016/0103225 A1 | 4/2016 | Grasso et al. |

FOREIGN PATENT DOCUMENTS

| CN | 203720359 | 7/2014 |
| EP | 2005581 | 12/2008 |

* cited by examiner

*Primary Examiner* — Bernarr E Gregory
*Assistant Examiner* — Fred H Mull
(74) *Attorney, Agent, or Firm* — Fogg & Powers LLC

(57) ABSTRACT

A tracking system comprising: a radio frequency (RF) signal circulator; an iridium modem coupled to first port of the circulator; an antenna coupled to second port of the circulator, wherein the circulator passes a signal transmitted by the modem to the antenna when the switch is switched to a first mode; a low noise amplifier (LNA) coupled to third port of the circulator, wherein the circulator passes RF signals received from the antenna to the LNA; a diplexer coupled to an output of the LNA; a GNSS receiver coupled to a first output of the diplexer through a GNSS filter; an iridium filter coupled to a second output of the diplexer; wherein the switch couples the iridium filter to the modem when the iridium modem is in a receiving mode, and wherein the switch couples the modem to the first port when the modem is in a transmitting mode.

19 Claims, 2 Drawing Sheets

ARCHITECTURE FOR SINGLE RADIO FREQUENCY FEED FOR GNSS RECEIVER AND IRIDIUM MODEM

BACKGROUND

Conventional systems use two separate feeds for Global Navigation Satellite System (GNSS) signals and Iridium signals. Two different feeds require two radio frequency cables, one for GNSS and one for Iridium. In many conventional systems that use a single feed point and cable, the GNSS receiver can get impacted and/or saturated due to strong iridium signals transmitted and leaked into the GNSS receiver.

Some conventional systems use a diplexer to isolate the GNSS signal and the Iridium signal. However, due to the proximity of frequency of GNSS constellations, such as Global Positioning System (GPS), Galileo E1 and GLONASS, with transmit frequency of Iridium, filtering the Iridium transmit signal in the GNSS path is complicated and may cause a jam. Further, using a diplexer at a front end of a wideband filter introduces less than 2 dB loss in the GNSS path affects the GNSS modem sensitivity.

Further, conventional tracking systems only have capabilities of supporting a single constellation. Some conventional systems can support multiple GNSS constellations with a limitation of having the same operating frequency for all constellations. Some conventional systems that cover multiple constellations with significant difference in operating frequency like GPS and GLONASS, are only able to isolate the transmitted iridium signal to within a three degree rejection.

For the reasons stated above and for the reasons stated below which will become apparent to those skilled in the art upon reading and understanding the specification, there is a need in the art for improved systems and methods for isolation of an Iridium signal from a GNSS signal using a single radio frequency (RF) feed.

SUMMARY

A tracking system is provided. The tracking system comprises: a radio frequency (RF) signal circulator; an iridium modem coupled to a first port of the circulator via a switch; an antenna coupled to second port of the circulator, wherein the circulator passes a signal transmitted by the iridium modem to the antenna when the switch is switched to a first mode; a low noise amplifier (LNA) coupled to a third port of the circulator, wherein the circulator passes received RF signals received from the antenna to the low noise amplifier; a diplexer coupled to an output of the low noise amplifier; a global navigation satellite system (GNSS) receiver coupled to a first output of the diplexer through a GNSS filter, wherein the GNSS filter filters out iridium signals; and an iridium filter coupled to a second output of the diplexer, wherein the iridium filter filters out GNNS signals. The Iridium filter is further coupled to the iridium modem via the switch, wherein the switch couples the iridium filter to the iridium modem when the iridium modem is in a receiving mode, and wherein the switch couples the iridium modem to the first port of the circulator when the iridium modem is in a transmitting mode.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
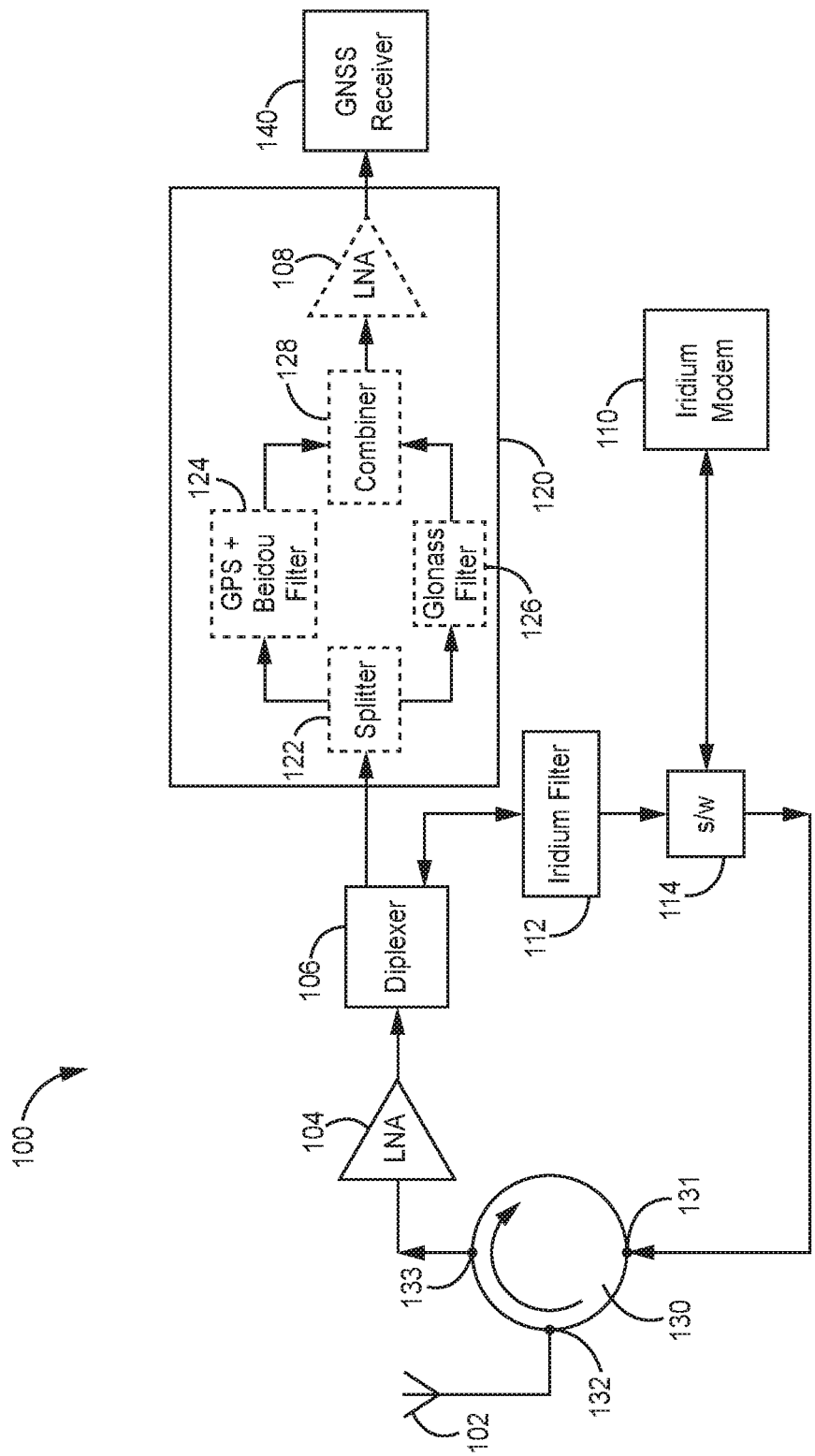
FIG. 1 is block diagram of an example tracking system for isolating an Iridium signal from the GNSS signal.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for isolating an Iridium signal from a GNSS signal using a single radio frequency (RF) feed. Specifically, as disclosed in the specification, embodiments provided herein facilitate the use of a single cable and antenna to receive and process both Iridium signals and GNSS signals while maintaining the sensitivity of the Iridium modem and the GNSS receiver.

FIG. 1 is a block diagram of example system 100 using a single radio frequency feed to protect the GNSS signal received by the GNSS receiver from the Iridium signal transmitted by the Iridium modem 110. System 100 includes a circulator 130 having at least three ports 131, 132, and 133. A signal fed at port 131 appears at port 132, and a signal fed at port 132 appears at port 133. Accordingly, energy from the signal fed at port 131 is substantially isolated by the time it reaches port 133. In exemplary embodiments, circulator 130 provides an isolation of at least 25 dB. In exemplary embodiments, signals fed to circulator 130 travel in a clockwise direction.

System 100 further includes an Iridium modem 110. In exemplary embodiments, Iridium modem 110 is a transceiver configured to transmit and receive signals. In exemplary embodiments, Iridium modem 110 does not transmit and receive signals simultaneously. That is, in exemplary embodiments, when Iridium modem 110 is in a transmit mode, it is not able to receive signals, and when Iridium modem 110 is in a receive mode, it is not able to transmit signals. Iridium modem 110 is configured to function in a transmit mode for a first predetermined period of time. In exemplary embodiments, the first predetermined period of time is 8 milliseconds. Iridium modem 110 is configured to function in a receive mode for a second predetermined period of time.

Iridium modem 110 is coupled to a switch 114, which is coupled to port 131 of circulator 130. Switch 114 is configured to have two modes. In exemplary embodiments, switch 114 is a single pole, single throw (SPDT) switch. In exemplary embodiments, switch 114 is controlled through the Iridium signal transmitted by Iridium modem 110. That is, when the Iridium modem 110 is in the transmit mode, switch 114 operates in a first mode, in which switch 114 is configured to route the Iridium signal transmitted from Iridium modem 110 into port 131 of circulator 130. Consequently, when the Iridium modem 110 is in the receive mode, switch 114 operates in a second mode, in which switch 114 is configured to receive an Iridium signal and transmit the received Iridium signal to Iridium modem 110.

In the embodiments described herein, the Iridium signal transmitted by Iridium modem 110 is also referred to as the transmitted Iridium signal. The transmitted Iridium signal passes through switch 114 and is received by circulator 130 at first port 131. Energy from the Iridium signal transmitting from first port 131 appears at the second port 132. The transmitted Iridium signal is then transmitted out to antenna 102 through port 132.

In some exemplary embodiments, a portion of the transmitted Iridium signal may leak and appear at port 133 of circulator 130. Port 133 is coupled to a first low noise amplifier (LNA) 104 included in tracking system 100 at port 133. In exemplary embodiments, the isolation provided between port 131 and 133 is at least 25 dB. Accordingly, when the transmitted Iridium signal, which is received at port 131, leaks and appears at port 133, it is attenuated by at least 25 dB. For example, a transmitted Iridium signal at port 131 that transmits energy at 37 dBm is isolated by 25 dB and appears at 12 dBm at port 133.

Further, signals received by antenna 102 also appear at port 133. Antenna 102 is configured to receive both GNSS signals and Iridium signals. In the embodiments described herein, Iridium signal received by antenna 102 is also referred to as received Iridium signal. Antenna 102 is coupled to circulator 130 at port 132. Accordingly, GNSS signals and/or Iridium signals received at port 132 appear at port 133.

Signals appearing at port 133 are received by LNA 104. LNA 104 amplifies the signal(s) and minimizes the noise in the received Iridium signal and the GNSS signal. Further, LNA 104 improves signal-to-noise-ratio (SNR) in the signals received by LNA 104.

The amplified signal from LNA 104, which may include the amplified received Iridium signal, the amplified transmitted Iridium signal or the amplified GNSS signal, is received by a diplexer 106. LNA 104 ensures that none of the signal reflected from diplexer 106 is fed back to circulator 130. Diplexer 106 is included in tracking system 100 and further filters the incoming amplified signal received from LNA 104. Diplexer 106 splits the incoming amplified signal in two parts, one received by a GNSS filter 120, and one received by an Iridium filter 112. In exemplary embodiments, diplexer 106 splits the incoming amplified signal into two equal parts.

Iridium filter 112 receives one part split from the incoming amplified signal by diplexer 106. Iridium filter 112 is coupled to diplexer 106. Iridium filter 112 is configured to pass a portion of the signal including the Iridium signal to switch 114 and reflects back the rest of it. However, when switch 114 is in transmit mode, Iridium modem 110 is unable to receive filtered signals from Iridium filter 112. Accordingly, when switch 114 is transmit mode, Iridium filter 112 reflects all of the signal back to diplexer 106. In exemplary embodiments, switch 114 is in transmit mode for a predetermined period of time. In further exemplary embodiments, the predetermined period of time is eight milliseconds.

All or part of the reflected portion of the signal from Iridium filter 112 is fed back to diplexer 106. The reflected signal is combined with the second part split from the incoming amplified signal, and is fed into GNSS filter 120. The reflected signal, which includes at least a portion of the GNSS signal, is combined in phase with the incoming amplified signal such that the GNSS energy in the combined signal is augmented. The augmented GNSS energy minimizes the loss as the signal is fed into GNSS filter 120.

GNSS filter 120 is configured to pass GNSS signals. In example embodiments, GNSS filter 120 has center frequency within a range from 1.57542 GHz to 1.602 GHz. In exemplary embodiments, GNSS filter 120 is configured to reject signals having a center frequency greater than 1.602 GHz. In further exemplary embodiments, GNSS filter 120 is configured to reject signals having a center frequency at 1.616 GHz. The filtered GNSS signal is received by GNSS receiver 140.

In exemplary embodiments, even with over 25 dBm isolation from circulator 130, a strong Iridium signal may still appear at the output of diplexer 106. Because GLONASS signal transmits at a center frequency close to the center frequency at which an Iridium signal transmits, increasing bandwidth of a single GNSS filter may not sufficiently reject the Iridium signal. Accordingly, in exemplary embodiments, two filters, a GPS-Beidou-Galileo filter 124 and a GLONASS filter 126, are utilized.

In such an example, GNSS filter 120 comprises a splitter 122 to split the received combined signal from diplexer 106 into two parts: a first part of the combined signal received by GPS-Beidou-Galileo filter 124 and a second part of the combined signal received by GLONASS filter 126. Splitter 122 receives the combined signal from diplexer 106, which includes the reflected signal from Iridium filter 112 along with the amplified signal from LNA 104.

GPS-Beidou-Galileo filter 124 has a center frequency within a range of 1.561 GHz to 1.57542 GHz. In exemplary embodiments, GPS-Beidou-Galileo filter 124 has a center frequency of 1.57542 GHz. In exemplary embodiments, GPS-Beidou-Galileo filter 124 provides at least a 25 dB rejection at a center frequency at which an Iridium signal is transmitted.

GLONASS filter 126 has a center frequency of 1.602 GHz. In exemplary embodiments, GLONASS filter 126 is a narrow band filter providing at least a 20 dB rejection at a center frequency at which an Iridium signal is transmitted (for example, 1.616 GHz).

Filtered signals output from GPS-Beidou-Galileo filter 124 and GLONASS filter 126 are then combined using a combiner 128. The combined GNSS signal is received by GNSS receiver 140. In exemplary embodiments, the combined GNSS signal has an isolation of at least 50 dB from the Iridium signal transmitted by Iridium modem 110. In exemplary embodiments, the combined GNSS signal is fed into a second LNA 108 to minimize the noise resulting in the combined GNSS signal prior to GNSS receiver 140 receiving the combined GNSS signal.

GNSS receiver 140 is configured to process the combined GNSS signal received from GNSS filter 120. The received GNSS signal can then be processed by the GNSS receiver 140 to provide data including but not limited to position, velocity and/or time of the GNSS receiver 140.

Figure 2:
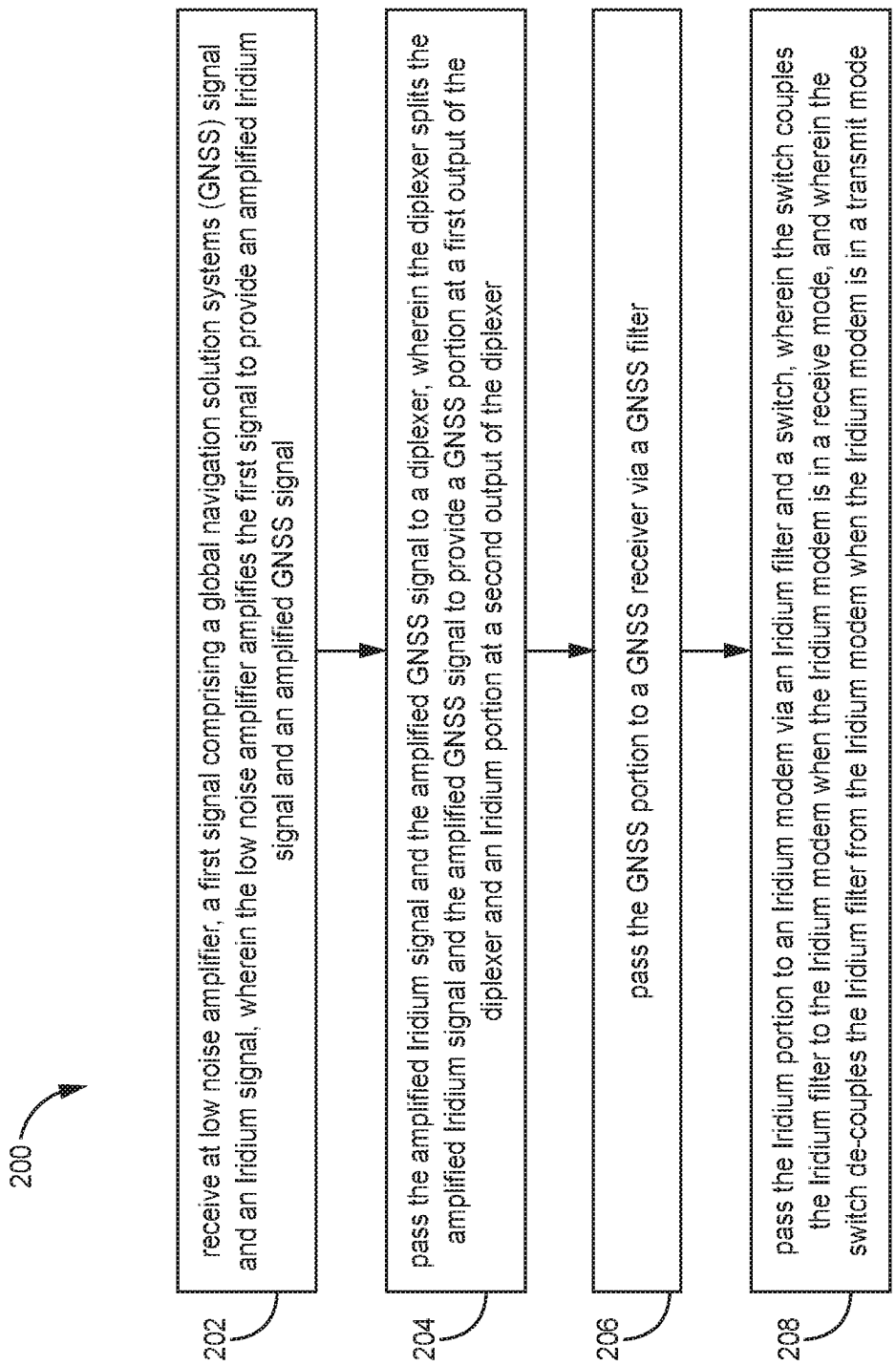
FIG. 2 is flow diagram of an example method for isolating an Iridium signal from the GNSS signal.

FIG. 2 is a flow diagram of an example method 200 of isolating an Iridium signal from a GNSS signal to be received by a GNSS receiver, such as GNSS receiver 140. It should be understood that method 200 may be implemented in conjunction with any of the various embodiments and implementations described in this disclosure above or below. As such, elements of method 200 may be used in conjunction with, in combination with, or substituted for elements of those embodiments. Further, the functions, structures and other description of elements for such embodiments described herein may apply to like named elements of method 200 and vice versa.

Method 200 begins at block 202 with receiving at low noise amplifier (LNA), such as LNA 104, a first signal comprising a global navigation solution systems (GNSS) signal and an Iridium signal, wherein the low noise amplifier amplifies the first signal to provide an amplified Iridium signal and an amplified GNSS signal. In exemplary embodiments, the Iridium modem is coupled to a first port of the circulator via a switch, such as switch 114, an antenna, such as antenna 102 is coupled to a second port of the circulator, and the LNA is coupled to received the first signal from the third port of the circulator.

In exemplary embodiments, when the Iridium modem is in a transmit mode, the switch operates to couple an output from the Iridium modem to the first port, such as port 131 of the circulator. In exemplary embodiments, the Iridium signal comprises a leakage signal that is leaking from a first port, such as port 131, to a third port, such as port 133, of a circulator, such as circulator 130 when the Iridium mode is in the transmit mode. In exemplary embodiments, receiving an Iridium signal comprises receiving an Iridium signal at a second port, such as port 132, wherein the Iridium signal is received from an antenna, such as antenna 102, when the Iridium modem is in a receive mode.

Method 200 proceeds to block 204 with passing the amplified Iridium signal and the amplified GNSS signal to a diplexer, wherein the diplexer splits the amplified Iridium signal and the amplified GNSS signal to provide a GNSS portion at a first output of the diplexer and an Iridium portion at a second output of the diplexer.

Method 200 then proceeds to block 206 with passing the GNSS portion to a GNSS receiver, such as GNSS receiver 140, via a GNSS filter. In exemplary embodiments, the GNSS filter passes signals that transmit at a center frequency within a range of 1.561 GHz to 1.602 GHz. In exemplary embodiments of method 200, passing the GNSS portion to a GNSS receiver further comprises splitting the GNSS portion into two additional parts, a global positioning system (GPS)/Beidou/Galileo part and a GLONASS part. Passing the GNSS portion to a GNSS receiver further comprises filtering signals in the GPS/Beidou/Galileo part to pass signals from the GPS/Beidou/Galileo part that transmit at a second center frequency and filtering signals in the GLONASS part to pass signals from the GLONASS part that transmit at a third center frequency. Finally, passing the GNSS portion to a GNSS receiver also comprises combining the filtered GPS/Beidou/Galileo signal and the filtered Glonass signal to provide the filtered GNSS signal. In exemplary embodiments of method 200, the second center frequency is within a range of 1.561 GHz to 1.57542 GHz. In exemplary embodiments, the third center frequency is 1.602 GHz. In further exemplary embodiments, method 200 comprises amplifying the filtered GNSS signal via a second LNA 108.

Method 200 proceeds to block 208 with passing the Iridium portion to an Iridium modem via an Iridium filter and a switch, wherein the switch couples the Iridium filter to the Iridium modem when the Iridium modem is in a receive mode, and wherein the switch de-couples the Iridium filter from the Iridium modem when the Iridium modem is in a transmit mode. In exemplary embodiments, the Iridium portion to pass signals from the Iridium portion that transmit at a first center frequency to the Iridium receiver. In exemplary embodiments, the first center frequency is 1.616 GHz. In exemplary embodiments, signals transmitting at a center frequency different from the first center frequency is reflected back to the diplexer. This reflected signal is then combined with the amplified signals in the GNSS portion to pass to the GNSS receiver.

Example Embodiments

Example 1 includes a tracking system comprising: a radio frequency (RF) signal circulator; an iridium modem coupled to a first port of the circulator via a switch; an antenna coupled to second port of the circulator, wherein the circulator passes a signal transmitted by the iridium modem to the antenna when the switch is switched to a first mode; a low noise amplifier (LNA) coupled to a third port of the circulator, wherein the circulator passes received RF signals received from the antenna to the low noise amplifier; a diplexer coupled to an output of the low noise amplifier; a global navigation satellite system (GNSS) receiver coupled to a first output of the diplexer through a GNSS filter, wherein the GNSS filter filters out iridium signals; an iridium filter coupled to a second output of the diplexer, wherein the iridium filter filters out GNNS signals; wherein the Iridium filter is further coupled to the iridium modem via the switch, wherein the switch couples the iridium filter to the iridium modem when the iridium modem is in a receiving mode, and wherein the switch couples the iridium modem to the first port of the circulator when the iridium modem is in a transmitting mode.

Example 2 includes the system of Example 1, wherein the LNA amplifies the Iridium signal and the GNSS signal to provide an amplified Iridium signal and an amplified GNSS signal.

Example 3 includes the system of any of Examples 1-2, wherein the diplexer is configured to: receive the amplified Iridium signal and the amplified GNSS signal from the LNA; and split the amplified Iridium signal and the amplified GNSS signal into two portions, a GNSS portion provided at the first output and an Iridium portion provided out the second output, wherein the diplexer provides isolation between the amplified GNSS signal and the amplified Iridium signal.

Example 4 includes the tracking system of any of Examples 1-3, wherein the GNSS filter is configured to receive the amplified signals in the GNSS portion, and wherein the GNSS filter is further configured to pass signals that transmit at a first center frequency; and wherein the Iridium filter is configured to receive the amplified signals in the Iridium portion, and to pass signals that transmit at a second center frequency.

Example 5 includes the tracking system of Example 4, wherein the Iridium filter is further configured to reflect back to the diplexer signals from the Iridium portion that do not transmit at a second center frequency, and wherein reflected signal is combined with the amplified signals in the GNSS portion.

Example 6 includes the tracking system of any of Examples 4-5, wherein the first center frequency is within a range of any of Examples 1-5.561 GHz to any of Examples 1-5.602 GHz, and wherein the second center frequency is Example 1.616 GHz.

Example 7 includes the tracking system of any of Examples 4-6, the GNSS filter further comprising: a splitter coupled to the diplexer, wherein the splitter is configured to receive the amplified signals in GNSS portion, and wherein the splitter is configured to further split the GNSS portion into two additional parts, a global positioning system (GPS)/Beidou/Galileo part and a GLONASS part; a GPS/Beidou/Galileo filter coupled to the splitter, wherein the GPS/

Beidou/Galileo filter is configured to receive the amplified signals in the GPS/Beidou/Galileo part, wherein the GPS/Beidou/Galileo filter is configured to pass signals that transmit at a third center frequency, and wherein the GPS/Beidou/Galileo filter provides a filtered GPS/Beidou/Galileo signal; a GLONASS filter coupled to the splitter, wherein the GLONASS filter is configured to receive the amplified signals in the GLONASS part, wherein the GLONASS filter is configured to pass signals that transmit at a fourth center frequency, and wherein the GLONASS filter provides a filtered GLONASS signal; and a combiner coupled to the GPS/Beidou/Galileo filter and the GLONASS filter, wherein the combiner combines the filtered GPS/Beidou/Galileo signal and the filtered Glonass signal to provide a filtered GNSS signal, and wherein the GNSS receiver is configured to receive the filtered GNSS signal.

Example 8 includes the tracking system of any of Examples 6-7, wherein the third center frequency is within a range of any of Examples 1-7.561 GHz to any of Examples 1-7.57542 GHz, and wherein the fourth center frequency is Example 1.602 GHz.

Example 9 includes the tracking system of any of Examples 6-8, further comprising a second LNA coupled to the combiner, wherein the second LNA is configured to receive the filtered GNSS signal from the combiner and amplify the filtered GNSS signal to provide an amplified filtered GNSS signal, and wherein the second LNA is further coupled to the GNSS receiver, wherein the GNSS receiver is configured to receive the amplified filtered GNSS signal.

Example 10 includes the tracking system of any of Examples 1-9, further comprising at least one Iridium receiver coupled to the at least one switch, wherein when the switch is operating in the second of the two modes, the Iridium receiver is configured to receive the amplified Iridium signal.

Example 11 includes the tracking system of Example 10, wherein the at least one Iridium modem is the at least one Iridium receiver configured to receive the amplified Iridium signal.

Example 12 includes the tracking system of any of Examples 1-11, wherein the switch is configured to couple the Iridum modem to the first port of the circulator during a first mode for 8 milliseconds.

Example 13 includes the tracking system of any of Examples 1-12, wherein the at least one switch is a single pole, double throw (SPDT) switch.

Example 14 includes a method of isolating an Iridium signal from a GNSS signal, the method comprising: receiving at low noise amplifier, a first signal comprising a global navigation solution systems (GNSS) signal and an Iridium signal, wherein the low noise amplifier amplifies the first signal to provide an amplified Iridium signal and an amplified GNSS signal; passing the amplified Iridium signal and the amplified GNSS signal to a diplexer, wherein the diplexer splits the amplified Iridium signal and the amplified GNSS signal to provide a GNSS portion at a first output of the diplexer and an Iridium portion at a second output of the diplexer; passing the GNSS portion to a GNSS receiver via a GNSS filter; passing the Iridium portion to an Iridium modem via an Iridium filter and a switch, wherein the switch couples the Iridium filter to the Iridium modem when the Iridium modem is in a receive mode, and wherein the switch de-couples the Iridium filter from the Iridium modem when the Iridium modem is in a transmit mode.

Example 15 includes the method of Example 14, wherein the Iridium modem is coupled to a first port of a circulator via the switch, wherein an antenna is coupled to a second port of the circulator, and wherein the low noise amplifier is coupled to receive the first signal from a third port of the circulator; and wherein when the Iridium modem is in a transmit mode, the switch operates to couple an output from the Iridium modem to the first port of the circulator.

Example 16 includes the method of Example 15, wherein the Iridium signal comprises a leakage signal that is leaking from the first port of the circulator to the third port of the circulator while the iridium modem is in the transmit mode.

Example 17 includes the method of any of Examples 15-16, wherein the Iridium signal comprises a wireless signal received by the antenna while the Iridium modem is in a receive mode.

Example 18 includes the method of any of Examples 14-17, wherein the Iridium filter passes the Iridium portion that transmits at a first center frequency to the Iridium receiver, the method further comprising: reflecting back to the diplexer, signals from the Iridium portion that transmit at a center frequency different from the first center frequency; and combining reflected signal with the amplified signals in the GNSS portion.

Example 19 includes the method of any of Examples 14-18, passing the GNSS portion to a GNSS receiver further comprises: splitting the GNSS portion into two additional parts, a global positioning system (GPS)/Beidou/Galileo part and a GLONASS part; filtering signals in the GPS/Beidou/Galileo part to pass signals from the GPS/Beidou/Galileo part that transmit at a second center frequency; filtering signals in the GLONASS part to pass signals from the GLONASS part that transmit at a third center frequency; and combining the filtered GPS/Beidou/Galileo signal and the filtered Glonass signal to provide the filtered GNSS signal.

Example 20 includes the method of Example 19, further comprising amplifying the filtered GNSS signal via a second low noise amplifier (LNA).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A tracking system comprising:
a radio frequency (RF) signal circulator;
an Iridium modem coupled to a first port of the circulator via a switch;
an antenna coupled to second port of the circulator, wherein the circulator passes a signal transmitted by the Iridium modem to the antenna when the switch is switched to a first mode;
a low noise amplifier (LNA) coupled to a third port of the circulator, wherein the circulator passes received RF signals received from the antenna to the low noise amplifier;
a diplexer coupled to an output of the low noise amplifier;
a global navigation satellite system (GNSS) receiver coupled to a first output of the diplexer through a GNSS filter, wherein the GNSS filter filters out Iridium signals;
an Iridium filter coupled to a second output of the diplexer, wherein the Iridium filter filters out GNSS signals;
wherein the Iridium filter is further coupled to the Iridium modem via the switch, wherein the switch couples the Iridium filter to the Iridium modem when the Iridium modem is in a receiving mode, and wherein the switch couples the Iridium modem to the first port of the circulator when the Iridium modem is in a transmitting mode.

2. The tracking system of claim 1, wherein the LNA amplifies the Iridium signal and the GNSS signal to provide an amplified Iridium signal and an amplified GNSS signal.

3. The tracking system of claim 2, wherein the diplexer is configured to:
receive the amplified Iridium signal and the amplified GNSS signal from the LNA; and
split the amplified Iridium signal and the amplified GNSS signal into two portions, a GNSS portion provided at the first output and an Iridium portion provided out the second output, wherein the diplexer provides isolation between the amplified GNSS signal and the amplified Iridium signal.

4. The tracking system of claim 3,
wherein the GNSS filter is configured to receive the amplified GNSS signals in the GNSS portion, and wherein the GNSS filter is further configured to pass signals that are transmitted at a first center frequency; and
wherein the Iridium filter is configured to receive the amplified Iridium signals in the Iridium portion, and to pass signals that are transmitted at a second center frequency.

5. The tracking system of claim 4, wherein the Iridium filter is further configured to reflect back to the diplexer signals from the Iridium portion that are not transmitted at a second center frequency, thereby forming reflected signals, and wherein the reflected signals are combined with the amplified signals in the GNSS portion.

6. The tracking system of claim 4, wherein the first center frequency is within a range of 1.561 GHz to 1.602 GHz, and wherein the second center frequency is 1.616 GHz.

7. The tracking system of claim 4, the GNSS filter further comprising:
a splitter coupled to the diplexer, wherein the splitter is configured to receive the amplified signals in the GNSS portion, and wherein the splitter is configured to further split the GNSS portion into two additional parts, a global positioning system (GPS)/Beidou/Galileo part and a GLONASS part;
a GPS/Beidou/Galileo filter coupled to the splitter, wherein the GPS/Beidou/Galileo filter is configured to receive the amplified signals in the GPS/Beidou/Galileo part, wherein the GPS/Beidou/Galileo filter is configured to pass signals that are transmitted at a third center frequency, and wherein the GPS/Beidou/Galileo filter provides a filtered GPS/Beidou/Galileo signal;
a GLONASS filter coupled to the splitter, wherein the GLONASS filter is configured to receive the amplified signals in the GLONASS part, wherein the GLONASS filter is configured to pass signals are transmitted at a fourth center frequency, and wherein the GLONASS filter provides a filtered GLONASS signal; and
a combiner coupled to the GPS/Beidou/Galileo filter and the GLONASS filter, wherein the combiner combines the filtered GPS/Beidou/Galileo signal and the filtered GLONASS signal to provide a filtered GNSS signal, and wherein the GNSS receiver is configured to receive the filtered GNSS signal.

8. The tracking system of claim 7, wherein the third center frequency is within a range of 1.561 GHz to 1.57542 GHz, and wherein the fourth center frequency is 1.602 GHz.

9. The tracking system of claim 7, further comprising a second LNA coupled to the combiner, wherein the second LNA is configured to receive the filtered GNSS signal from the combiner and amplify the filtered GNSS signal to provide an amplified filtered GNSS signal, and wherein the second LNA is further coupled to the GNSS receiver, wherein the GNSS receiver is configured to receive the amplified filtered GNSS signal.

10. The tracking system of claim 2, wherein when the switch is operating in a second mode, the Iridium modem is configured to receive the amplified Iridium signal.

11. The tracking system of claim 1, wherein the switch is configured to couple the Iridium modem to the first port of the circulator during the first mode for 8 milliseconds.

12. The tracking system of claim 1, wherein the at least one switch is a single pole, double throw (SPDT) switch.

13. A method of isolating an Iridium signal from a GNSS signal, the method comprising:
receiving at low noise amplifier, a first signal comprising a global navigation satellite system (GNSS) signal and an Iridium signal, wherein the low noise amplifier amplifies the first signal to provide an amplified Iridium signal and an amplified GNSS signal;
passing the amplified Iridium signal and the amplified GNSS signal to a diplexer, wherein the diplexer splits the amplified Iridium signal and the amplified GNSS signal to provide a GNSS portion at a first output of the diplexer and an Iridium portion at a second output of the diplexer;
passing the GNSS portion to a GNSS receiver via a GNSS filter;
passing the Iridium portion to an Iridium modem via an Iridium filter and a switch, wherein the switch couples the Iridium filter to the Iridium modem when the Iridium modem is in a receive mode, and wherein the switch de-couples the Iridium filter from the Iridium modem when the Iridium modem is in a transmit mode.

14. The method of claim 13,
wherein the Iridium modem is coupled to a first port of a circulator via the switch, wherein an antenna is coupled to a second port of the circulator, and wherein the low noise amplifier is coupled to receive the first signal from a third port of the circulator; and
wherein when the Iridium modem is in the transmit mode, the switch operates to couple an output from the Iridium modem to the first port of the circulator.

15. The method of claim 14, wherein the Iridium signal comprises a leakage signal that is leaking from the first port of the circulator to the third port of the circulator while the Iridium modem is in the transmit mode.

16. The method of claim 14, wherein the Iridium signal comprises a wireless signal received by the antenna while the Iridium modem is in the receive mode.

17. The method of claim 13, wherein the Iridium filter passes the Iridium portion that is transmitted at a first center frequency to the Iridium modem, the method further comprising:
reflecting back to the diplexer, signals from the Iridium portion that are transmitted at a center frequency different from the first center frequency, thereby forming reflected signals; and
combining the reflected signals with the amplified signals in the GNSS portion.

18. The method of claim 13, passing the GNSS portion to a GNSS receiver further comprises:

splitting the GNSS portion into two additional parts, a global positioning system (GPS)/Beidou/Galileo part and a GLONASS part;

forming a filtered GPS/Beidou/Galileo signal by filtering signals in the GPS/Beidou/Galileo part to pass signals from the GPS/Beidou/Galileo part that are transmitted at a second center frequency;

forming a filtered GLONASS signal by filtering signals in the GLONASS part to pass signals from the GLONASS part that are transmitted at a third center frequency; and combining the filtered GPS/Beidou/Galileo signal and the filtered GLONASS signal to provide a filtered GNSS signal.

19. The method of claim 18, further comprising amplifying the filtered GNSS signal via a second low noise amplifier (LNA).

* * * * *